United States Patent [19]

Dawson

[11] 3,840,102
[45] Oct. 8, 1974

[54] ROLLER CONVEYOR WITH PLASTIC WHEEL ASSEMBLY

[75] Inventor: Clarence G. Dawson, Dallas, Tex.

[73] Assignee: Fei, Inc., Dallas, Tex.

[22] Filed: Dec. 7, 1972

[21] Appl. No.: 312,854

[52] U.S. Cl. .............................................. 193/35 R
[51] Int. Cl. ............................................. B65g 13/12
[58] Field of Search .......................... 193/35 R, 37

[56] References Cited
UNITED STATES PATENTS

| | | | |
|---|---|---|---|
| 2,052,900 | 9/1936 | Searles et al. | 193/37 X |
| 2,563,965 | 8/1951 | Seed | 193/35 R X |
| 2,600,747 | 6/1952 | Faust | 193/35 R X |
| 3,037,403 | 6/1962 | Kornylak | 193/37 |
| 3,400,988 | 9/1968 | Hudson et al. | 193/37 X |
| 3,586,142 | 6/1971 | Inwood et al. | 193/35 |

FOREIGN PATENTS OR APPLICATIONS

| 820,514 | 9/1959 | Great Britain | 193/35 R |
|---|---|---|---|

Primary Examiner—Evon C. Blunk
Assistant Examiner—W. Scott Carson
Attorney, Agent, or Firm—Richards, Harris & Medlock

[57] ABSTRACT

The specification discloses a roller conveyor assembly which includes a plurality of spaced parallel rails extending in the direction of conveyance. A plurality of axles are mounted to and extend transversely of the rails. Each axle rotatably mounts a plurality of conveyor wheels by means of cylindrical wheel bushings located between the wheels and the axle. The wheels are separated from one another and the frame by means of a plurality of cylindrical spacers. The conveyor wheels are constructed from a self-lubricating plastic having high abrasion resistance and a low coefficient of sliding friction. In the preferred embodiment, the wheels are comprised of an ultra-high molecular weight polymer having a coefficient of friction of about 0.11 and a specific gravity of about 0.945.

2 Claims, 3 Drawing Figures

PATENTED OCT 8 1974 3,840,102

ROLLER CONVEYOR WITH PLASTIC WHEEL ASSEMBLY

FIELD OF THE INVENTION

This application relates to roller conveyors, and more particularly, to roller conveyors having plastic wheel assemblies.

THE PRIOR ART

Roller conveyors are commonly used in a variety of applications in manufacturing and fabrication plants and in food processing plants such as those designed for fowl processing. Generally, the roller conveyors comprise an array of axle mounted wheels, the upper peripheral surfaces of which lie in a common plane which is slightly inclined to the horizontal. Articles to be conveyed are placed on the upper surfaces of the wheels and gravity action cause the articles to roll along the wheels and down the conveyor.

Conventionally, conveyor wheels are constructed from a metal such as steel and are supported by a plurality of ball bearings. One disadvantage of prior art metal wheels is that they are subject to rust and the bearings generally require periodic lubrication. Moreover, when such conveyors are used in food processing plants the liquid drip and run-off from the food articles being conveyed further accelerates the rusting process of the steel wheels. Further, the lubrication necessary to sustain operation of the ball bearings contributes to contamination of the food products and may result in totally unacceptable, unsanitary conditions. Thus, a need exists for roller conveyor wheels which are not subject to rust, do not need periodic lubrication, and are not subject to binding or severe wear problems.

SUMMARY OF THE INVENTION

In accordance with the present invention, a roller conveyor includes a rigid frame forming a generally rectangular surface. A plurality of axles extend in parallel across the frame and are connected at each end to the frame. A plurality of wheels, the tops of which lie in a common plane, are spaced along each of the axles and are operable to rotate freely about the axles. Each of the wheels is constructed from an ultra-high molecular weight polymer having a high abrasion resistance and a low coefficient of friction so that an object may be easily rolled along the length of the frame over the tops of the wheels.

DESCRIPTION OF THE DRAWINGS

For a more complete understanding of the present invention and for further objects and advantages thereof, reference is now made to the following description taken in conjunction with the accompanying drawing, in which.

DESCRIPTION OF THE PREFERRED EMBODIMENT

Figure 1:
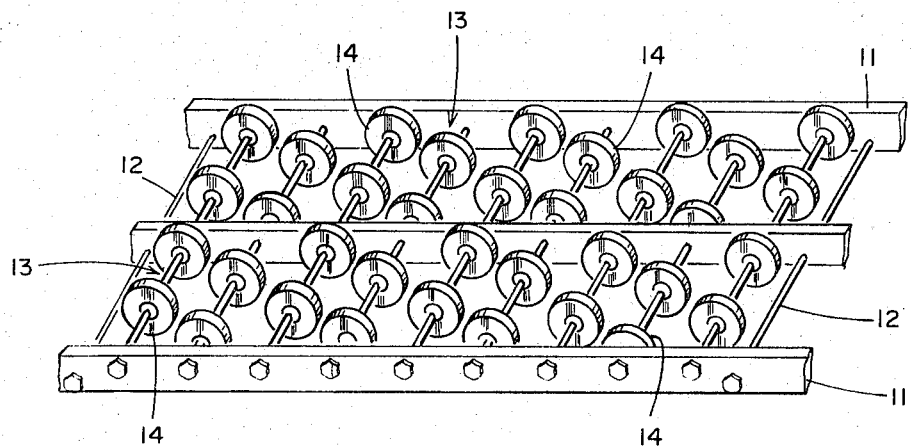
FIG. 1 is a perspective view illustrating a section of a roller conveyor constructed in accordance with the invention.

FIG. 1 illustrates a section of a roller conveyor constructed in accordance with the invention. The conveyor includes a rigid frame comprising a plurality of parallel rails 11 which extend in the direction of conveyance and form a generally rectangular surface. The rails 11 are held in a parallel configuration by periodically spaced, transversely extend crossbraces 12. A plurality of axles 13 are attached at each end to the rails 11 and extend in parallel across the frame. Each axle 13 has a plurality of wheels 14 rotatably mounted thereto to rotate freely about the axles. The upper peripheral surfaces of the wheels 14 lie generally in a common plane so that an article to be conveyed (not shown) having a generally flat surface will be supported by the periphery of the wheels 14 as it passes down the conveyor.

Figure 2:
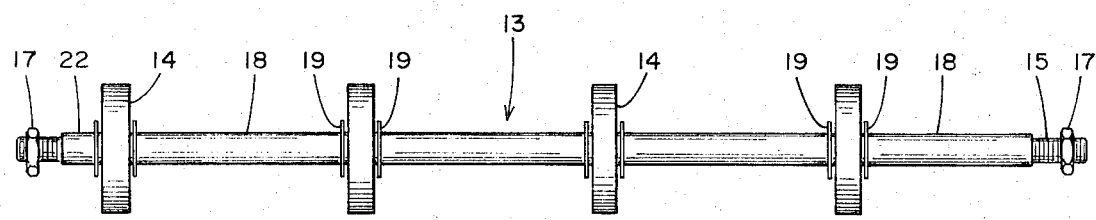
FIG. 2 is a plan view of an axle and wheel assembly of the roller conveyor shown in FIG. 1.

Referring now to FIG. 2, there is shown a plan view of a wheel and axle assembly from the roller conveyor of FIG. 1. The assembly includes an axle 13 having a threaded section 15 at either end which receives conventional nuts 17 for attachment to the conveyor frame. A plurality of wheels 14 are rotatably mounted on the axle 13 and are spaced from one another by means of a plurality of cylindrical spacers 18. Each one of the wheels 14 is spaced from the adjacent wheel by cylindrical sleeves 18 and flat washers 19.

Figure 3:
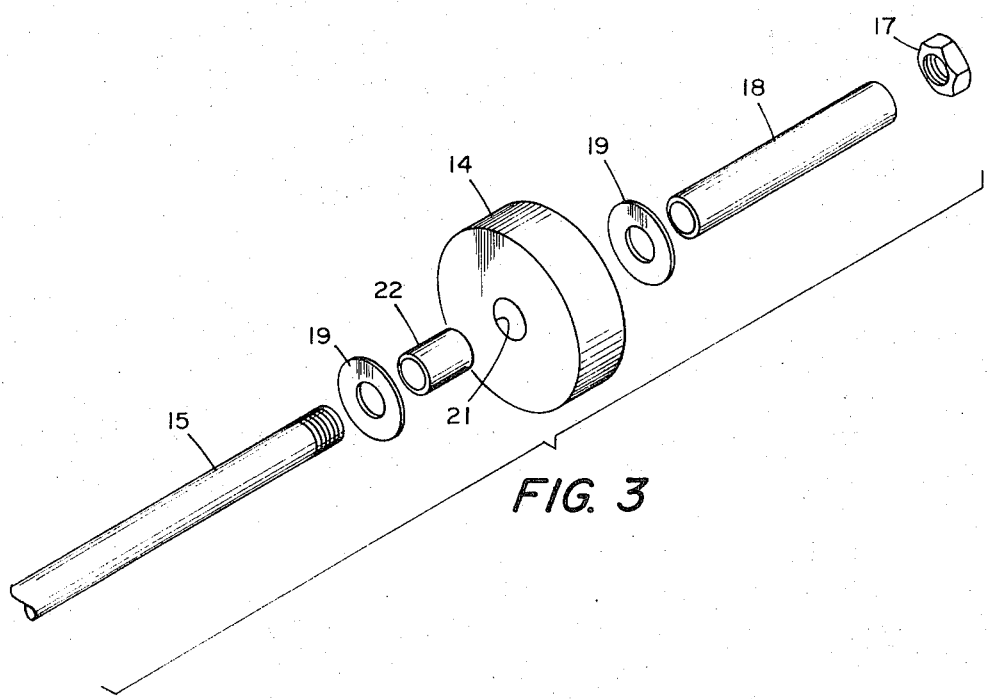
FIG. 3 is an exploded view of a conveyor wheel and axle assembly constructed in accordance with the invention.

Referring to the exploded view of the wheel assembly shown in FIG. 3, each wheel 14 includes an axially extending cylindrical aperture 21 which is larger than the diameter of the axle 13. A cylindrical wheel bushing 22 is mounted within the aperture 21 to surround the axle 13 between the wheel 14 and the axle 13. A pair of flat washers 19 are mounted on opposite sides of the wheel 14 to retain the bushing within the aperture 21. Each of the wheels 14 are spaced from one another and from the frame of the conveyor by a plurality of cylindrical spacers 18 disposed about the axle 13. The diameter of the bushings 18 is larger than the axial openings in the washers 19 and abut against the surfaces of the washers 19 to hold the wheels in a spaced relationship with one another.

The spacers 18 used in the conveyor of FIG. 1 are of various lengths so that the wheels mounted along each axle are laterally offset relative to the wheels mounted along adjacent axles to provide a staggered support surface for objects to be rolled along the conveyor.

An important aspect of the conveyor wheel assembly of the roller conveyor of the present invention is a type of plastic utilized to form the wheels 14. In the preferred embodiment of the invention, an ultra-high molecular weight polymer having high abrasion resistance and a low coefficient of friction is desired. Such plastic is self-lubricating and thus does not require periodic maintenance during use and also eliminates possible contamination of food products being conveyed by lubricants. Moreover, the plastic is not subject to excessive wear problems and does not require expensive ball bearing mounting due to its low coefficient of friction.

A material suitable for use in forming the wheels 14 is the plastic manufactured and sold under the trademark " 1900 UHMW" by Hercules Chemical Corp. of Wilmington, Delaware. Alternatively, an ultra-high molecular weight polymer manufactured and sold under the registered trademark "IMPAX" by Impact Plastics, Inc. of Gastonia, North Carolina, may also be utilized. The preferred physical characteristics of an ultra-high molecular weight polymer to be utilized for the construction of the wheels 14 are as follows:

Coefficient of Friction—0.11
Hardness, Rockwell (D785)—R45
Specific Gravity—0.945
Cubic Inches Per Pound—29
Maximum Service Temperature—2500° F. (continuously); 250° F. (intermittently)
Chemical Resistance—highly resistant to all chemicals with the exception of strong oxidizing acids
Abrasion Resistance—unequalled by any other thermoplastic
Tensile Strength (AT2" min. as per ASTMD-412) p.s.e.)—6650
FDA Concurrent Schedule—Reg. No. 121.2501

It will thus be seen that the present roller conveyor eliminates the use of conventional ball bearing steel wheels and instead employs plastic wheel assemblies. The wheel assembly of the present invention does not require lubrication for continuous operation, is not subject to contamination problems, is resistant to shock abrasion, and has been found to provide long-wearing characteristics with little maintenance problems. A further advantage of the roller conveyor of the present invention is that it may be easily sterilized and thus may be utilized for applications such as fowl processing which require a high degree of sanitation.

Having described the invention in connection with certain specific embodiments thereof, it is to be understood that further modifications may now suggest themselves to those skilled in the art and it is intended to cover such modifications as fall within the scope of the appended claims.

What is claimed is:

1. A roller conveyor comprising:
   a frame having a pair of spaced apart elongated sides;
   a plurality of parallel axles extending across said frame and rigidly connected at the ends thereof to said sides;
   each axle including a plurality of cylindrical wheel bushings spaced apart along the length of said axle, the inner diameters of said bushings being larger than the diameter of said axles so that said bushings are positionable along said axles;
   plastic wheels constructed from ultra-high molecular weight polymer having high abrasion resistance and a low co-efficient of friction rotatably mounted about each of said wheel bushings; and
   cylindrical spacers disposed about said axles and extending between each of said wheel bushings;
   washers disposed between each of said bushings and spacers;
   the diameter of said spacers and bushings being larger than the inner diameter of said washers whereby the washers are abuttingly held between a spacer and a bushing in a predetermined position along the length of said axles;
   said spacers having varied lengths such that the wheels spaced along an axle are laterally staggered relative to the wheels spaced along the adjacent axles;
   wherein an object may be easily rolled along the length of said frame over the top of said wheels.

2. The roller conveyor of claim 1 wherein said polymer has a coefficient of friction of about 0.11 and a specific gravity of about 0.945.

* * * * *